(12) United States Patent
Zhang et al.

(10) Patent No.: US 9,938,083 B2
(45) Date of Patent: Apr. 10, 2018

(54) MECHANICAL ROCKER ARM-TYPE VERTICAL FEEDING CUSHIONING DEVICE

(71) Applicant: CHINA UNIVERSITY OF MINING AND TECHNOLOGY, Xuzhou, Jiangsu Province (CN)

(72) Inventors: Jixiong Zhang, Xuzhou (CN); Qiang Zhang, Xuzhou (CN); Rui Gao, Xuzhou (CN); Hao Yan, Xuzhou (CN); Meng Li, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 0 days.

(21) Appl. No.: 14/917,817

(22) PCT Filed: Apr. 21, 2015

(86) PCT No.: PCT/CN2015/077028
§ 371 (c)(1),
(2) Date: Mar. 9, 2016

(87) PCT Pub. No.: WO2015/161768
PCT Pub. Date: Oct. 29, 2015

(65) Prior Publication Data
US 2017/0283174 A1    Oct. 5, 2017

(30) Foreign Application Priority Data
Apr. 21, 2014 (CN) .......................... 2014 1 0161593

(51) Int. Cl.
*B65G 11/20* (2006.01)
*B65G 65/32* (2006.01)
(Continued)

(52) U.S. Cl.
CPC .......... *B65G 11/206* (2013.01); *B65G 11/088* (2013.01); *B65G 65/32* (2013.01);
(Continued)

(58) Field of Classification Search
CPC ... B65G 11/206; B65G 11/203; B65G 11/086; B65G 11/088; B65G 69/12; B65G 69/16;
(Continued)

(56) References Cited

U.S. PATENT DOCUMENTS 715,560 A * 12/1902 Dedrick ............... B65G 11/088
                                                                    182/48
3,530,966 A *  9/1970 Mathews ............. B65G 11/206
                                                                    193/29
(Continued)

FOREIGN PATENT DOCUMENTS

CN       201056408 Y     5/2008
CN       203345611      12/2013
(Continued)

*Primary Examiner* — Leslie A Nicholson, III
*Assistant Examiner* — Keith R Campbell
(74) *Attorney, Agent, or Firm* — Flener IP & Business Law; Zareefa B. Flener

(57) ABSTRACT

A mechanical rocker-arm type vertical feeding cushioning device, consisting of two identical cushioning units and a box body (7). The two cushioning units are respectively arranged with a certain height difference on the inner side of the box body (7). Each cushioning unit consists of a cushioning mechanism and a fixing hinge mechanism. The cushioning mechanism is composed of a cushioning plate (1), a spring (5) and a balance weight (6). The fixing hinge mechanism is composed of a hinge plate (2), a right angle circular rod (3) and an elastic limiting device (4). The cushioning plate (1) is fixed to the hinge plate (2) via connection holes and using bolts. The hinge plate (2) is welded to the right angle circular rod (3). The elastic limiting device (4) consists of two elastic limiting plates and a hollow iron ring in a welded manner. The right angle circular rod (3) is connected to the elastic limiting device (4) in a sleeved manner via the hollow iron ring of the elastic limiting device (4). An upper end of the spring (5) is connected to the right (Continued)

angle circular rod (3), and the balance weight (6) is suspended at a lower end of the spring (5). Material is fed to the cushioning plates via a feeding pipe, and falls down after being cushioned twice by the cushioning plates (1). The cushioning device repeatedly cushions and recovers under the joint effect of the cushioning plates (1) and the cushioning balances (6).

4 Claims, 2 Drawing Sheets

(51) Int. Cl.
  *B65G 69/00* (2006.01)
  *B65G 11/08* (2006.01)
  *B65G 69/16* (2006.01)
(52) U.S. Cl.
  CPC ............ *B65G 69/00* (2013.01); *B65G 69/16* (2013.01); *B65G 2201/045* (2013.01); *B65G 2207/28* (2013.01); *B65G 2814/0211* (2013.01)
(58) Field of Classification Search
  CPC .......... B65G 2201/045; B65G 2207/28; B65G 2814/0211; B65G 65/32; B65G 69/00
  USPC ...................................... 193/27, 32; 198/534
  See application file for complete search history.

(56) References Cited

U.S. PATENT DOCUMENTS

| | | | | |
|---|---|---|---|---|
| 4,390,090 A * | 6/1983 | Kossebau | ............. | B65D 90/54 |
| | | | | 193/32 |
| 4,498,569 A * | 2/1985 | Tanaka | .................... | G07F 11/24 |
| | | | | 193/27 |
| 5,150,765 A * | 9/1992 | Chen | ...................... | A63G 31/00 |
| | | | | 182/48 |
| 5,813,072 A | 9/1998 | Alexander | | |
| 5,903,464 A * | 5/1999 | Stingel, Jr. | ........... | B65G 1/1378 |
| | | | | 198/347.1 |
| 6,622,849 B1 * | 9/2003 | Sperling | .............. | B65D 90/623 |
| | | | | 198/532 |
| 7,401,709 B2 * | 7/2008 | Stingel, Jr. | ........... | B65G 11/086 |
| | | | | 193/27 |
| 7,882,933 B2 * | 2/2011 | Freudelsperger | .... | B65G 1/1376 |
| | | | | 186/2 |
| 7,963,383 B2 * | 6/2011 | Stingel, III | ............ | B65G 1/026 |
| | | | | 198/347.1 |
| 9,434,544 B1 * | 9/2016 | Ruzicka | ............... | B65G 11/206 |

FOREIGN PATENT DOCUMENTS

| | | |
|---|---|---|
| CN | 102815552 A | 6/2014 |
| CN | 103935778 A | 7/2014 |
| GB | 2450487 A | 12/2008 |
| JP | 2000247448 A | 9/2000 |

\* cited by examiner

MECHANICAL ROCKER ARM-TYPE VERTICAL FEEDING CUSHIONING DEVICE

FIELD OF THE INVENTION

The present invention relates to a mechanical rocker arm-type vertical feeding cushioning device, which is especially suitable for cushioning the feeding of material from ground in a material feeding cushioning system for fully-mechanized solid-backfill mining in coal mines and metal mines.

BACKGROUND OF THE INVENTION

Presently, large-scale exploitation of the coal resource under railroads, water bodies, and constructions have been realized with a backfill mining technique; thus, the coal yield of coal mine is effectively increased, ground surface control is achieved, and the problem of ground waste stacking is solved. In a feeding system for backfill mining, gangues are usually thrown from a level that is higher than the well bottom by hundreds or thousands of meters to the mine shaft bottom. Thus, when the gangues reach to the mine shaft bottom, the speed of the gangues is usually more than 100 m/s. The high-speed gangues have huge impact force, and may cause severe damage to the wall of down-hole storage silo when they reach to the mine shaft bottom if they are not cushioned; consequently, the service life of the storage silo may be shortened, and waste of resource may occur.

CONTENTS OF THE INVENTION

Technical Problem

To solve the existing problems in the prior art, the present invention provides a mechanical rocker arm-type vertical feeding cushioning device, which has a simple structure, is safe and efficient, can effectively reduce the impact force of the falling material and protect the wall of down-hole storage silo from damage.

Technical Scheme

The mechanical rocker arm-type vertical feeding cushioning device provided in the present invention comprises a box body, and two cushioning units disposed in an upper layer and a lower layer in a staggered manner on the box body, each cushioning unit consists a cushioning mechanism and a fixing hinge mechanism respectively, the cushioning mechanism comprises a cushioning plate, a spring, and a balance weight, the fixing hinge mechanism comprises a right-angle round rod and a hinge plate welded to the right-angle round rod, and an elastic limiting device is disposed on the two sides of the hinge plate, wherein, the elastic limiting device comprises two elastic limiting plates and a hollow iron hoop, the elastic limiting plates are fixed to the upper surface and lower surface of the hollow iron hoop, the right-angle round rod is plug-in mounted in the hollow iron hoop of the elastic limiting device, the cushioning plate is fixed to the hinge plate and swings up and down along with the hinge plate, the upper end of the spring is connected to the right-angle round rod and the lower end of the spring hangs the balance weight.

In the elastic limiting device, the included angle between the two elastic limiting plates is equal to the included angle between the edge of the spring hung outside of the box body and the horizontal plane when the right-angle round rod is in its natural state.

The balance weight is a homogeneous iron block, the weight of which is determined according to the feeding height; the initial weight of the balance weight (6) is set to 25 kg, the weight of the balance weight (6) increases by 1 kg if the feeding height increases by 10 m, and the maximum weight of the balance weight (6) does not exceed 125 kg.

The spacing between the two cushioning units disposed in an upper layer and a lower layer in a staggered manner is 300-500 mm; the projection of the two cushioning plates in the horizontal direction has an overlap, and the overlap area is ⅕-¼ of the area of the cushioning plate.

Beneficial Effects

With the above technical scheme, when the material is fed through a feeding pipe to the cushioning plates of the cushioning device, the material falls down after being cushioned twice by the two cushioning plates; the cushioning device repeatedly cushions and recovers under the joint effect of the cushioning plates and the cushioning balance weights. The impact force of the falling material can be effectively reduced and the material can be effectively cushioned, damages to the storage silo is reduced and smooth operation of backfill mining is ensured. Field tests of the mechanical rocker arm-type vertical feeding cushioning device in fully-mechanized solid-backfill coal mining have shown: the material thrown from the ground surface through a feeding pipe to the mine shaft bottom is cushioned by the device effectively; the impact of the material to the wall of storage silo is greatly reduced, and the solid material can be fed safely. The entire device has a simple structure, is easy to use, safe and efficient, requires very low investment, has wide practicability in backfill mining in coal mines, and has reference significance for other mines.

Figure 1:
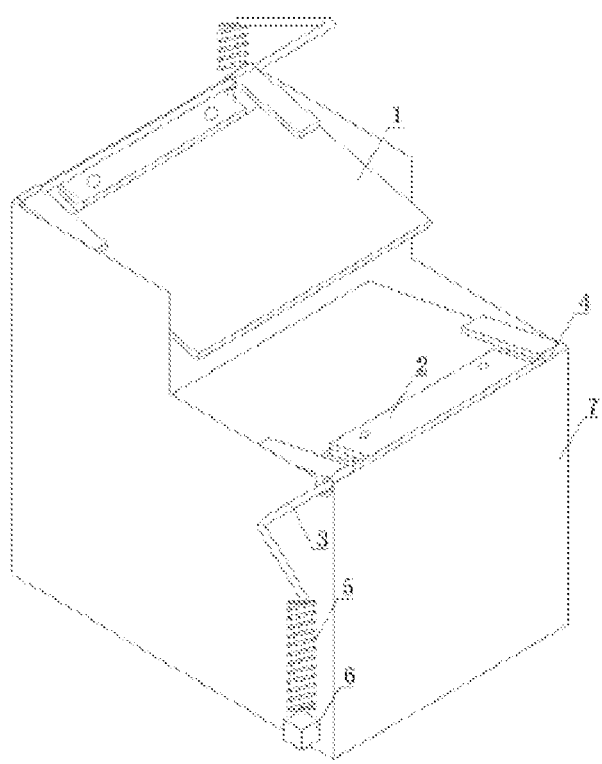
FIG. 1 is a schematic structural diagram according to the present invention.
Figure 2:
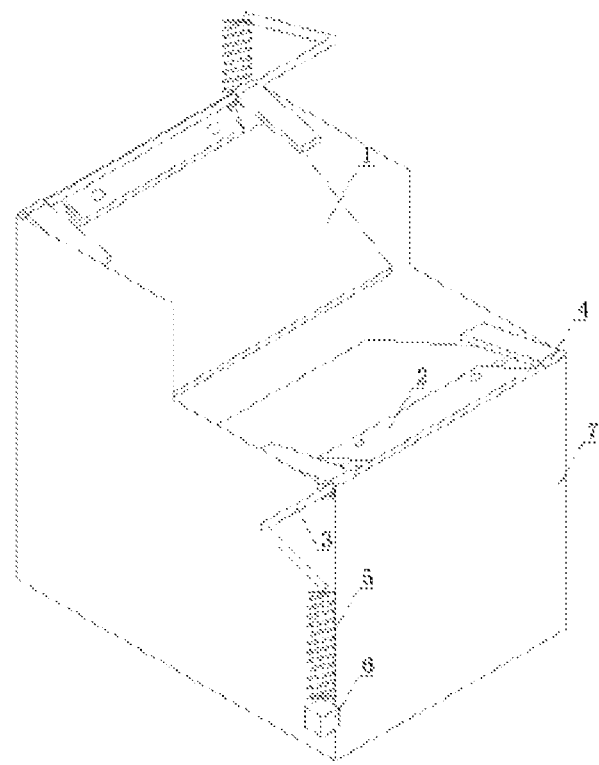
FIG. 2 is a schematic structural diagram in working state according to the present invention.
Figure 3:
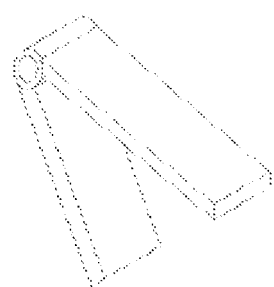
FIG. 3 is a schematic structural diagram of the elastic limiting device according to the present invention.

Among the figures: 1—cushioning plate; 2—hinge plate; 3—right-angle round rod; 4—elastic limiting device; 5—spring; 6—balance weight; 7—box body.

DETAILED DESCRIPTION OF THE EMBODIMENTS

Hereunder the present invention will be further detailed in an embodiment, with reference to the accompanying drawings.

The mechanical rocker arm-type vertical feeding cushioning device provided in the present invention mainly comprises two identical cushioning units and a box body, the two cushioning units are disposed with a certain height difference on the inner of the box body respectively, and each cushioning unit comprises a cushioning mechanism and a fixing hinge mechanism; the cushioning mechanism comprises a cushioning plate 1, a spring 5, and a balance weight 6, the fixing hinge mechanism comprises a hinge plate 2, a right-angle round rod 3, and elastic limiting devices 4, the cushioning plate 1 has two connecting holes on one side, the hinge plate 2 has two connecting holes at the same dimensions to the connection holes of the cushioning plate 1, the cushioning plate 1 and the hinge plate 2 are fixed together by bolts through the connecting holes, and the hinge plate 2 is connected to the right-angle round rod 3 by welding; the elastic limiting devices 4 consist two elastic limiting plates and a hollow iron hoop in a welded manner, wherein, the elastic limiting plate is fixed to the upper surface and lower surface of the hollow iron hoop, the right-angle round rod 3 is connected to the elastic limiting devices 4 in a sleeved manner via the hollow iron hoops in the elastic limiting devices 4, and the elastic limiting devices 4 is fixed to the box body 7; in the elastic limiting devices 4, the included angle between the two elastic limiting plates is equal to the included angle between the edge of the spring 5 hung outside of the box body 7 and the horizontal plane when the right-angle round rod 3 is in its natural state; the upper end of the spring 5 is connected to the right-angle round rod 3, the lower end of the spring 5 hangs the balance weight 6; the balance weight 6 is a homogeneous iron block, the weight of which is determined according to the feeding height; the initial weight of the balance weight (6) is set to 25 kg, the weight of the balance weight (6) increases by 1 kg if the feeding height increases by 10 m, and the maximum weight of the balance weight (6) does not exceed 125 kg; the two cushioning units are fixed to the box body 7, with 300 mm-500 mm height difference in the vertical direction at the horizontal section of the right-angle round rod 3, i.e., the spacing between the two cushioning units disposed in an upper layer and a lower layer in a stagger manner is 300-500 mm; the projection of the two cushioning plate 1 in the horizontal direction has an overlap, and the overlap area is ⅕-¼ of the area of the cushioning plate.

During operation, the material is fed vertically through a feeding pipe from the ground to the mechanical rocker arm-type vertical feeding cushioning device; under the impact force from the material, the cushioning plate 1 turns downwards around the axis of the horizontal section of the right-angle round rod 3; thus, the material is cushioned by the upper cushioning plate 1 first, and then is cushioned by the lower cushioning plate 1 for twice cushion; after the material is cushioned twice, it falls to the storage silo at a low speed; at the same time, as the cushioning plate 1 turns downwards, the force moment of the cushioning plate 1 in relation to the axis of the right-angle round rod 3 is reduced gradually, while the force moment of the spring 5 and the balance weight 6 in relation to the axis of the right-angle round rod 3 is increased gradually; consequently, the cushioning plate 1 tends to move upwards around the axis of the right-angle round rod 3, till the force moment of the cushioning plate 1 in relation to the axis of the right-angle round rod 3 is balanced by the force moment of the balance weight 6 in relation to the axis of the right-angle round rod 3; in addition, when the two cushioning plates 1 move downwards and reach to their maximum limit positions, their outer edges are in the same plumb line; thus, the cushioning plates 1 always take a cushioning action on the material. At the end of material feeding, the cushioning plates 1 turn upwards under the action of the balance weight 6, till they recover to their natural state. That process repeats cyclically as the material falls; thus, the material fed through the feeding pipe is cushioned continuously. The mechanical rocker arm-type vertical feeding cushioning device can reduce damages to the wall of the storage silo, and realize safe material feeding.

The invention claimed is:

1. A mechanical rocker arm-type vertical feeding cushioning device, comprising a box body (7), and two cushioning units disposed in an upper layer and a lower layer in a staggered manner on the box body (7), each cushioning units consists a cushioning mechanism and a fixing hinge mechanism respectively, the cushioning mechanism comprises a cushioning plate (1), a spring (5), and a balance weight (6), the fixing hinge mechanism comprises a right-angle round rod (3) and a hinge plate (2) welded to the right-angle round rod (3), and an elastic limiting device (4) is disposed on the two sides of the hinge plate (2), wherein, the elastic limiting device (4) comprises two elastic limiting plates and a hollow iron hoop, the elastic limiting plates are fixed to the upper surface and lower surface of the hollow iron hoop, the right-angle round rod (3) is plug-in mounted in the hollow iron hoop of the elastic limiting devices (4), the cushioning plate (1) is fixed to the hinge plate (2) and swings up and down along with the hinge plate (2), the upper end of the spring (5) is connected to the right-angle round rod (3) and the lower end of the spring (5) hangs the balance weight (6).

2. The mechanical rocker arm-type vertical feeding cushioning device according to claim 1, wherein: in the elastic limiting devices (4), the included angle between the two elastic limiting plates is equal to the included angle between the edge of the spring (5) hung outside of the box body (7) and the horizontal plane when the right-angle round rod (3) is in its natural state.

3. The mechanical rocker arm-type vertical feeding cushioning device according to claim 1, wherein: the balance weight (6) is a homogeneous iron block, the weight of which is determined according to the feeding height; the initial weight of the balance weight (6) is set to 25 kg, the weight of the balance weight (6) increases by 1 kg if the feeding height increases by 10 m, and the maximum weight of the balance weight (6) does not exceed 125 kg.

4. The mechanical rocker arm-type vertical feeding cushioning device according to claim 1, wherein: the spacing between the two cushioning units disposed in an upper layer and a lower layer in a staggered manner is 300-500 mm; the projecting of the two cushioning plates (1) in the horizontal direction forms an overlap with each one of the cushioning plates (1) including an overlap segment, wherein each of the overlap segments has an area ⅕-¼ of the area of one of the cushioning plates (1).

* * * * *